United States Patent Office 3,219,432
Patented Nov. 23, 1965

3,219,432
FERTILIZER COMPOSITION CONTAINING CONDENSATION PRODUCTS OF UREA AND ALDEHYDE
Helmut K. Schäfer, Frankfurt am Main, and Fritz Kalk, Russelsheim (Main), Germany, assignors to Farbwerke Hoechst Aktiengesellschaft vormals Meister Lucius & Brüning, Frankfurt am Main, Germany, a corporation of Germany
No Drawing. Filed Mar. 5, 1963, Ser. No. 262,835
Claims priority, application Germany, Mar. 6, 1962, F 36,202
2 Claims. (Cl. 71—28)

The present invention is concerned with condensation products of urea and aldehydes as fertilizers.

In the fertilization of cultivated plants with nitrogen-containing compounds the difficulty is frequently encountered that the usually applied inorganic nitrogen compounds are too readily soluble in water and, hence, are often washed out of the soil before they can be consumed by the plant. It has been known to use as fertilizers compounds of sparingly soluble nitrogen which have been prepared by the condensation of urea and formaldehyde. It has turned out, however, that the nitrogen content of such compounds is fixed to too large an extent and cannot be completely utilized by the plant (cf. E. J. Rubins, F. E. Bear, Soil Sci. 54, 411 (1942)). So compounds have to be found which contain both readily soluble and slowly soluble nitrogen in a proportion favourable for the plant and in such a form that the nitrogen can be completely utilized by the plant.

It has now been found that condensation products of urea and n-butyraldehyde and/or isobutyraldehyde which contain urea and aldehyde in a proportion of 1:1 to 2.5:1, preferably 1.8:1 to 2:1, are particularly suitable fertilizers.

The reaction product of two molecules of urea with one molecule of aldehyde has the structure of alkylidene-diureides. Products obtained by the condensation of n-butyraldehyde or isobutyraldehyde with 1 to 2.5, preferably 1.8 to 2, moles of urea are also useful fertilizers.

The said condensation products suitable as fertilizers can be prepared by contacting the aldehyde, in solution, with about twice the molar quantity of urea, preferably while adding small quantities of inorganic or organic acids, and isolating the condensation product by a known method.

During the preparation of such products other plant nutrients, for example, phosphates, potassium compounds and trace elements, may be added, so that mixed fertilizers are obtained in which the effect of the nitrogen is in part retarded. Furthermore, an advantage for the incorporated plant nutrients lies in the improvement of soil-fixation, so that they are less liable to be washed out by rain, etc.

It is particularly advantageous to carry out the condensation in the absence of solvents, for example, in a kneader, mixer or a pug mill, and, if desired, to add further plant nutrients during the kneading or granulating operation. Thus a granular product is obtained which can be prepared in a particularly advantageous way since here the isolating, mixing and granulating operations which are necessary in the first-mentioned process can be dispensed with.

Whether the nitrogen is quickly available for the plant or after some delay only can be ascertained by a test according to Kralovec and Morgan (cf. Journal of Agricultural and Food Chemistry 2, (1954) page 92).

According to said test method a distinction is made between nitrogen soluble in cold water and consequently readily available for the plant and nitrogen soluble in hot water and slowly available for the plant, whereas nitrogen that is soluble neither in cold nor in hot water is to be regarded as practically unavailable for the plant.

From Table 1 given below it can be seen that in the known condensation product of urea and formaldehyde the portion of nitrogen that is insoluble in hot or cold water is within the order of 50%. This fact accounts for the poor fertilizing value of said compound.

In contradistinction thereto, the alkylidene diureides according to the invention contain an insignificant portion of nitrogen unavailable for the plant and they contain readily soluble and slowly soluble nitrogen in a proportion within the range of 1:2 to 1:1.

TABLE 1

| Substance | Nitrogen soluble in cold water, percent | Nitrogen soluble in hot water, percent | Insoluble portion, percent |
|---|---|---|---|
| Condensation product of urea and formaldehyde | 25 | 25 | 50 |
| Condensation product of isobutyraldehyde and urea (1:2) | 36 | 63 | 1 |
| Condensation product of isobutyraldehyde and urea (1:2) prepared in the absence of a solvent | 45 | 54 | 1 |
| Condensation product of n-butyraldehyde, isobutyraldehyde and urea (0.5:0.5:2) | 64 | 35 | 1 |

The following example serves to illustrate the invention but is not intended to limit it thereto.

Example

In the following vegetation test the fertilizing effect of a condensation product of urea and formaldehyde (38.6% of N) was compared with that of a condensation product of urea and isobutyraldehyde (32.2% of N) which had been prepared from 2 mols of urea and 1 mol of isobutyraldehyde. The said condensation products were used for fertilizing cultures of rye-grass in Mitscherlich pots. In addition to a fertilizer based on phosphorus and potassium, 2 g. of nitrogen were given per pot in the form of the above cited condensation products.

Table 2 shows the average yields of plant material in air-dried condition per vessel obtained by four parallel tests.

TABLE 2

| | First yield | Second yield | Third yield | Fourth yield | Total yield (absolute) | Total yield (relative) |
|---|---|---|---|---|---|---|
| Without nitrogen | 14.0 | 4.2 | 1.4 | 1.6 | 21.2 | 57 |
| 2 g.N (condensation product of urea and formaldehyde containing 38.6% of nitrogen) | 18.6 | 9.7 | 4.2 | 4.7 | 37.2 | 100 |
| 2 g.N (condensation product of urea and isobutyraldehyde containing 32.2% of nitrogen) | 18.8 | 14.4 | 6.8 | 6.9 | 46.9 | 126 |

We claim:
1. A fertilizing composition containing condensation products of urea with at least one member selected from the group consisting of n-butyraldehyde and isobutyraldehyde, the urea and the aldehyde being present in a ratio within the range of 1.8:1 to 2:1.
2. A fertilizing composition according to claim 1 wherein said condensation product is admixed with at least one member selected from the group consisting of phosphates and potash.

References Cited by the Examiner

UNITED STATES PATENTS

| | | | |
|---|---|---|---|
| 2,729,611 | 1/1956 | Chesley et al. | 71—28 |
| 2,916,371 | 12/1959 | O'Donnell | 71—28 |
| 2,945,322 | 7/1960 | Gaeth et al. | 71—28 |
| 3,054,669 | 9/1962 | Jung et al. | 71—28 |

DONALL H. SYLVESTER, *Primary Examiner.*

ANTHONY SCIAMANNA, *Examiner.*